US012685935B2

(12) United States Patent
Bickle et al.

(10) Patent No.: US 12,685,935 B2
(45) Date of Patent: Jul. 21, 2026

(54) VOLUMETRIC REALTIME FOG OF WAR

(71) Applicant: Tencent America LLC, Palo Alto, CA (US)

(72) Inventors: Benjamin Bickle, Palo Alto, CA (US); Theodore Park, Palo Alto, CA (US); Michael Cuevas, Palo Alto, CA (US); Gavin Newton Glenn Mcdowell, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 238 days.

(21) Appl. No.: 18/428,456

(22) Filed: Jan. 31, 2024

(65) Prior Publication Data

US 2025/0242237 A1 Jul. 31, 2025

(51) Int. Cl.
| | |
|---|---|
| *A63F 13/52* | (2014.01) |
| *A63F 13/69* | (2014.01) |
| *G06T 13/60* | (2011.01) |
| *G06T 15/04* | (2011.01) |
| (Continued) | |

(52) U.S. Cl.
CPC .............. *A63F 13/52* (2014.09); *A63F 13/69* (2014.09); *G06T 13/60* (2013.01); *G06T 15/04* (2013.01); *G06T 15/08* (2013.01); *G06T 17/20* (2013.01); *A63F 2300/663* (2013.01); *A63F 2300/6692* (2013.01); *G06T 2210/12* (2013.01); *G06T 2210/21* (2013.01); *G06T 2210/36* (2013.01); *G06T 2215/12* (2013.01)

(58) Field of Classification Search
CPC .......... A63F 13/52; A63F 13/57; A63F 13/69;

A63F 2300/64; A63F 2300/66; A63F 2300/663; A63F 2300/6638; A63F 2300/6692; G06T 2215/12; G06T 17/20; G06T 2210/12; G06T 13/60; G06T 15/04; G06T 15/08
See application file for complete search history.

(56) References Cited

U.S. PATENT DOCUMENTS

| | | | | |
|---|---|---|---|---|
| H1812 H | * | 11/1999 | Arcuri | G06T 11/40 |
| | | | | 345/428 |
| 6,121,977 A | * | 9/2000 | Arai | G06T 15/00 |
| | | | | 345/619 |

(Continued)

OTHER PUBLICATIONS

International Search Report and Written Opinion received for PCT Patent Application No. PCT/US2025/013571, mailed on Mar. 31, 2025, 8 pages.

*Primary Examiner* — William H Mcculloch, Jr.
(74) *Attorney, Agent, or Firm* — ArentFox Schiff LLP

(57) ABSTRACT

A method of forming a volumetric effect on a game map of a video game is provided. In the method, a variable density volume of the game map is determined based on a mesh of the game map and a bounding box. The variable density volume includes the volumetric effect. The variable density volume is sliced into a plurality of texture layers. Each of the plurality of texture layers includes information associated with at least one of the volumetric effect or the mesh. An interaction between a virtual object on the game map and the volumetric effect is determined based on movement of the virtual object. The volumetric effect is rendered based on a cut out of the virtual object in the variable density volume and the determined interaction.

19 Claims, 12 Drawing Sheets

(51) Int. Cl.
    *G06T 15/08*        (2011.01)
    *G06T 17/20*        (2006.01)

(56)         References Cited

U.S. PATENT DOCUMENTS

| | | | | |
|---|---|---|---|---|
| 6,765,570 | B1 * | 7/2004 | Cheung | G06T 15/08 715/848 |
| 7,250,945 | B1 * | 7/2007 | Scaman | G06T 13/60 345/420 |
| 8,717,377 | B2 * | 5/2014 | Tawaraishi | G06T 15/04 382/229 |
| 10,740,951 | B2 * | 8/2020 | Young | G06F 3/147 |
| 11,074,724 | B2 * | 7/2021 | Gueniot | G06T 11/10 |
| 11,335,058 | B2 * | 5/2022 | Loodin Ek | G06T 15/20 |
| 12,284,349 | B2 * | 4/2025 | Nguyen Canh | H04N 19/124 |
| D1,099,923 | S * | 10/2025 | Park | D14/485 |
| 2006/0087509 | A1 * | 4/2006 | Ebert | G06T 13/60 345/473 |
| 2012/0148162 | A1 * | 6/2012 | Zhang | G06T 7/11 382/195 |
| 2015/0228114 | A1 * | 8/2015 | Shapira | G06T 15/08 345/421 |
| 2019/0180499 | A1 * | 6/2019 | Caulfield | G06F 9/30029 |
| 2019/0325634 | A1 * | 10/2019 | Young | G06F 3/013 |
| 2022/0114787 | A1 * | 4/2022 | Loodin Ek | G06T 17/005 |
| 2022/0392023 | A1 * | 12/2022 | Wolfe | G06T 5/60 |
| 2022/0392142 | A1 * | 12/2022 | Wolfe | G06T 5/70 |
| 2023/0377267 | A1 * | 11/2023 | Tessari | G06T 15/06 |
| 2024/0015289 | A1 * | 1/2024 | Nguyen Canh | H04N 19/184 |
| 2024/0176931 | A1 * | 5/2024 | Wu | G06F 30/23 |
| 2025/0032915 | A1 * | 1/2025 | Fortuna | A63F 13/52 |
| 2025/0036102 | A1 * | 1/2025 | Fortuna | A63F 13/65 |
| 2025/0222354 | A1 * | 7/2025 | Haines | A63F 13/5258 |
| 2025/0242237 | A1 * | 7/2025 | Bickle | G06T 13/60 |

* cited by examiner

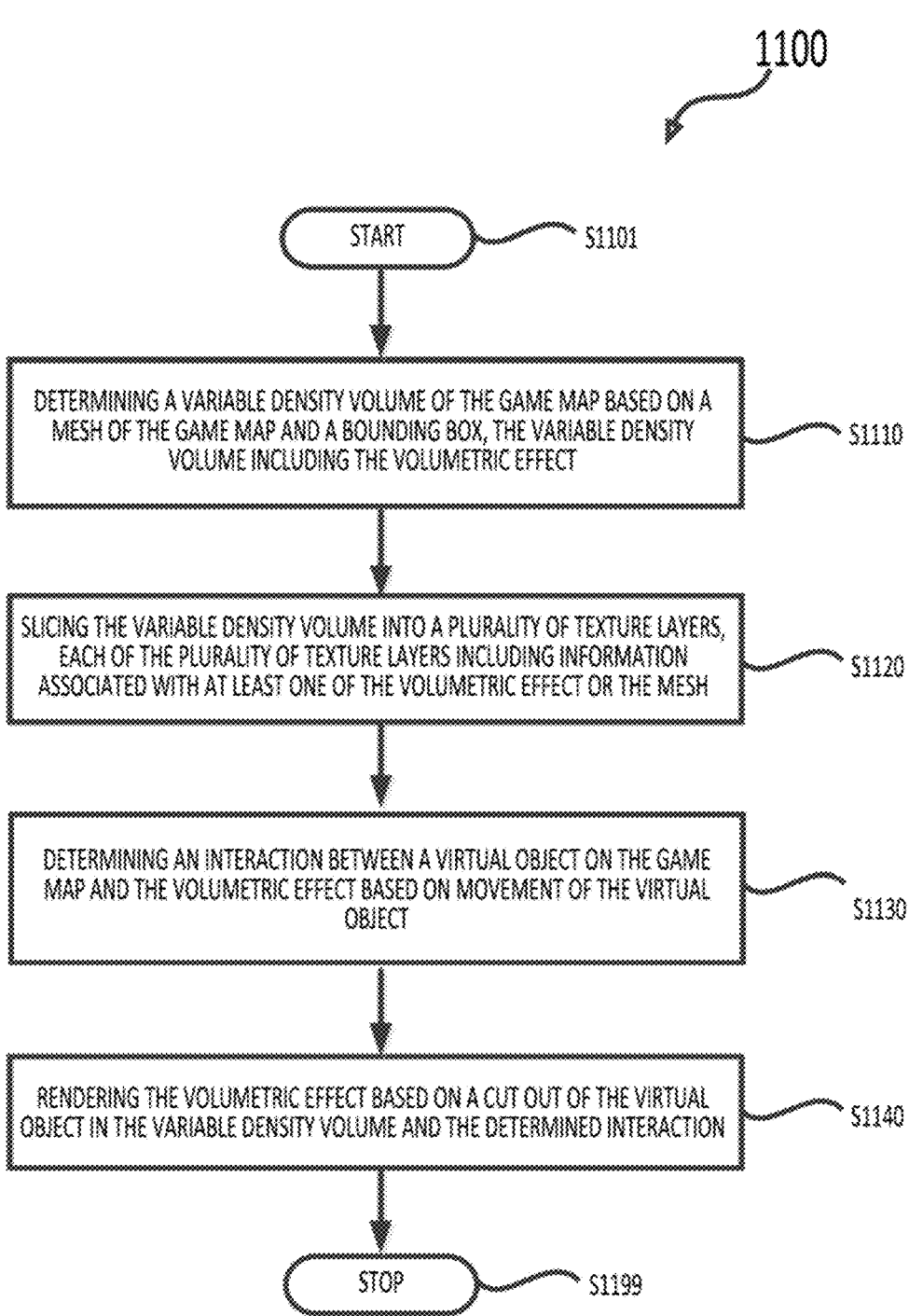

1100

START — S1101

DETERMINING A VARIABLE DENSITY VOLUME OF THE GAME MAP BASED ON A MESH OF THE GAME MAP AND A BOUNDING BOX, THE VARIABLE DENSITY VOLUME INCLUDING THE VOLUMETRIC EFFECT — S1110

SLICING THE VARIABLE DENSITY VOLUME INTO A PLURALITY OF TEXTURE LAYERS, EACH OF THE PLURALITY OF TEXTURE LAYERS INCLUDING INFORMATION ASSOCIATED WITH AT LEAST ONE OF THE VOLUMETRIC EFFECT OR THE MESH — S1120

DETERMINING AN INTERACTION BETWEEN A VIRTUAL OBJECT ON THE GAME MAP AND THE VOLUMETRIC EFFECT BASED ON MOVEMENT OF THE VIRTUAL OBJECT — S1130

RENDERING THE VOLUMETRIC EFFECT BASED ON A CUT OUT OF THE VIRTUAL OBJECT IN THE VARIABLE DENSITY VOLUME AND THE DETERMINED INTERACTION — S1140

STOP — S1199

FIG. 11

VOLUMETRIC REALTIME FOG OF WAR

TECHNICAL FIELD

The present disclosure describes embodiments generally related to apparatuses and methods of generation of volumetric Fog of War in real time based on volumetric effects.

BACKGROUND

Fog of War has traditionally been represented as an overlay or overlays of various amounts of opacity to represent lack of battlefield knowledge in strategy games, but is usually treated as an abstract concept, commonly manifesting as an overall darkening of regions of a gameplay space. While players understand that Fog of War is usually treated as the abstract concept, the abstract concept rarely looks visually impressive, nor does the abstract concept fit with narrative of the gameplay space.

SUMMARY

Aspects of the disclosure include methods, apparatuses, and non-transitory computer-readable storage mediums for forming volumetric Fog of War in real time based on volumetric effects.

According to an aspect of the disclosure, a method of forming a volumetric effect on a game map of a video game is provided. In the method, a variable density volume of the game map is determined based on a mesh of the game map and a bounding box. The variable density volume includes the volumetric effect. The variable density volume is sliced into a plurality of texture layers. Each of the plurality of texture layers includes information associated with at least one of the volumetric effect or the mesh. An interaction between a virtual object on the game map and the volumetric effect is determined based on movement of the virtual object. The volumetric effect is rendered based on a cut out of the virtual object in the variable density volume and the determined interaction.

In an aspect, a source mesh is generated in the game map, where the source mesh includes at least one environment element in the game map. Edges and vertices of the source mesh are reduced to generate the mesh.

In an example, the volumetric effect includes one of a cloud layer, a fog layer, a dust storm, and a rainfall.

In an aspect, the variable density volume is sliced into the plurality of texture layers, where each of the plurality of texture layers is parallel to a cross-sectional plane of the bounding box.

In an example, the interaction includes at least one of a twist speed, a wind direction, a gradient falloff, a push/pull parameter, or a repel strength.

In an aspect, a signed distance field (SDF) that includes an invisible geometric region in each of the plurality of texture layers is determined. The virtual object is cut out from the plurality of texture layers to determine a boundary region of the virtual object. The interaction between the boundary region of the virtual object and the volumetric effect is further determined.

In an aspect, a top region of the variable density volume is removed to determine a base height texture.

In an aspect, a 3D noise texture is added to the base height texture in the variable density volume, where the added 3D noise texture has a relative movement with respect to the base height texture.

In an aspect, additional movement information is added to the volumetric effect in the bounding box based on a flow map.

In an aspect, at least one of an opacity or a color gradient of the volumetric effect varies along a height of the variable density volume.

In an aspect, a sheen associated with the volumetric effect is generated by adjusting volumetric falloff parameters of a surface shader, where the volumetric falloff parameters indicate how light bounces off the volumetric effect.

In an aspect, scene lighting is generated based on a ray cast of light inside the volumetric effect.

In an aspect, the volumetric effect is rendered at a reduced resolution with respect to a resolution of a game display of the video game. In an aspect, pixels of the volumetric effect positioned in a checkerboard grid pattern are rendered.

In an aspect, a post blurring process is applied to the volumetric effect to reduce aliasing of the volumetric effect.

According to another aspect of the disclosure, an apparatus is provided. The apparatus has processing circuitry. The processing circuitry can be configured to perform any one or a combination of the methods for generating of the volumetric Fog of War in real time.

Aspects of the disclosure also provide a non-transitory computer-readable medium storing instructions which when executed by at least one processor cause the at least one processor to perform any one or a combination of the methods for generating of the volumetric Fog of War in real time.

BRIEF DESCRIPTION OF THE DRAWINGS

Further features, the nature, and various advantages of the disclosed subject matter will be more apparent from the following detailed description and the accompanying drawings in which:

FIG. 11 shows a flow chart outlining an exemplary process to generate volumetric Fog of War in real time according to some embodiments of the disclosure.

DETAILED DESCRIPTION

Figure 1:
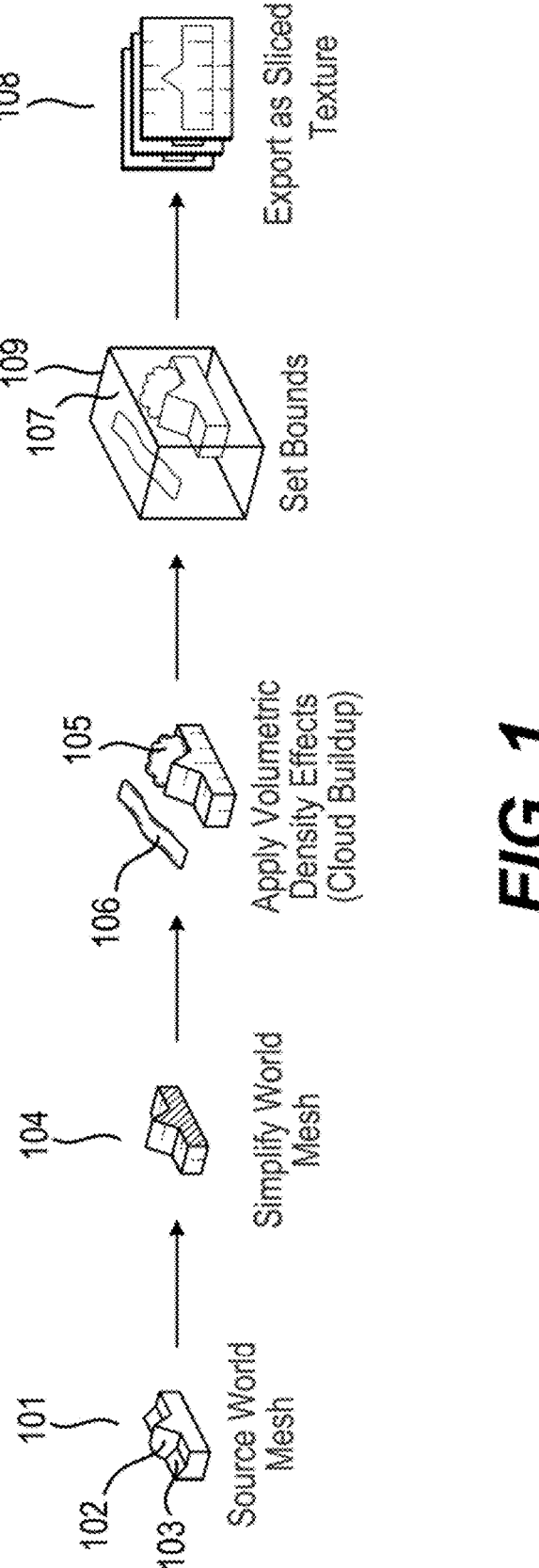
FIG. 1 shows exemplary diagrams of a preprocessing step to generate a volumetric effect in real time in accordance with some embodiments.

Fog of War can refer to a physical manifestation of areas of a gameplay map where a player may have no information or limited information. Fog of War is traditionally presented as overlays of varying opacity where some gameplay assets and/or three-dimensional (3D) shapes can be seen, representing limited tactical information. Volumetric effects, at a high level, can refer to 3D volumes that contain an effect to represent gasses or liquids with a higher density then air. Common examples in games include clouds, fog, smoke, or liquid caustics that are drawn using path tracing techniques to calculate a light bounce at a pixel level.

Fog of War can be a de facto standard in strategy games. Realtime strategies need precise cutouts (or removal) of fog to represent exactly what units (also referred to as game characters or virtual objects) can or cannot see and turn-based strategies can often be more tile-based or hex-based. Visuals for Fog of War system in real-time strategy (RTS) games are often minimalist since the RTS games can be computationally expensive to render and are well understood by players of the genre (or the genre of games) as an abstract gameplay aspect.

In the disclosure, Fog of War can be approached (or provided) as a weather pattern (or volumetric effect), such as a cloud layer, a fog layer, a dust storm, a rainfall, or other natural occurring reasons for limited visibility. To achieve the weather pattern, a dynamic volumetric fluid simulation can be created to represent the weather pattern (e.g., fog) with high fidelity.

In an aspect, a 3D fluid simulation can be applied to allow hundreds of individual actors to impact the weather pattern (e.g., fog) in real time, combining accuracy of vision that is needed for a fast-paced game without sacrificing visual quality, in which units can move through the weather pattern (e.g., fog) to cause turbulence and push through a volume with various user accessible settings.

In a related Fog of War system, such as the Fog of War system in a game of Dune: Spice Wars, volumetric effects are applied to represent sandstorms which are clear in large tiles when units enter a space of the sandstorms. Solutions of the current disclosure can be far more interactive and accurate to represent an explicit vision range of gameplay units as the gameplay units move across the gameplay space.

A volumetric effect solution of the present disclosure can be custom made for high volume and real-time changes to a weather state (e.g., a fog state). Although the volumetric effect solution is made for a top-down game where gameplay elements can be clear and perturb the density volume, the volumetric effect solution can also have a potential use in any title (or situation) when volumetric effects interact a gameplay element and/or when a graphics budget exists to render 3D volumetrics in real-time, such as a PC or next-gen multiplayer online battle arena (MOBA), or a horror game where revealing or hiding elements in an interactive fog is part of the atmosphere or gameplay.

While neither a real-time volumetric rendering nor a fluid simulation is unique, a combination of these two technologies in a real-time game can be unique. Unlike commercially available solutions to optimize a handful of objects that can perturb or influence fog, or small volumes that only take up a portion of a screen, the solution of the present disclosure can handle hundreds of perturbing objects acting on the volumetric effect (e.g., fog) at any given moment while rendering with a full screen coverage. In an aspect, the solution of the present disclosure to forming a volumetric effect on a game map of a video game can include three key steps: preprocessing, simulation, and rendering. The volumetric effect can be a weather pattern represented in the game map, such as a cloud layer, a fog layer, a dust storm, or a rainfall.

In the disclosure, for simplicity and clarity, forming a volumetric effect on a game map of a video game can be discussed by forming a fog in the game map. It should be noted that the methods in the disclosure can be applied to form any weather pattern presented in the game map (or gameplay place).

In the preprocessing, a static volumetric effect can be built. For example, a static fog can be built in the game map. In the simulation, a fluid simulation can be performed to provide animatic/moving fog. The fluid simulation can simulate a fluid effect (or interaction) of the fog with moving game units (or game characters). The fluid effect indicates how the fog is disturbed by the game units. In the rendering, the disturbed fog by the game units can be rendered to a game screen for a player.

Performing a full fluid simulation on an entire gameplay volume can be expensive. However, environment of the gameplay volume may not be ignored to study the impact on a look of a fog volume. In an aspect of the disclosure, a mountain on a flat landscape can be applied as an environmental factor to impact the fog volume. A mountain can be large enough to impact weather systems. In the disclosure, effects of rain-shadow and mountain generated weather effects can be replicated. Impact of the landscape on a weather pattern (or volumetric effect), such as fog, can be provided as an example.

In an aspect, effects (or volumetric effects) caused by the environment can be simulated by taking a 3D geometry of the environment and applying processing steps to the 3D geometry.

In an aspect, the reprocessing can be illustrated in FIG. 1. As shown in FIG. 1, a source world mesh (or a source mesh) (101) can be generated in a game map (or gameplay space), where the source world mesh (101) can include at least one environment element in the game map. For example, the source world mesh (101) can include a mountain (or mountain mesh) (102) and a landscape (or landscape mesh) (103).

Still referring to FIG. 1, the source world mesh (101) can be simplified into a simplified world mesh (or a mesh) (104). For example, the source world mesh (101) can be simplified by reducing edges and vertices of the source world mesh (101) to generate the mesh (104).

Further, effects (or volumetric effects), such as snow build up (105) and a fog layer (106), can be applied to the simplified mesh (or mesh) (104). The volumetric effects can give pockets of higher and lower density fog when the volumetric effects are cast from different directions.

Figure 2:
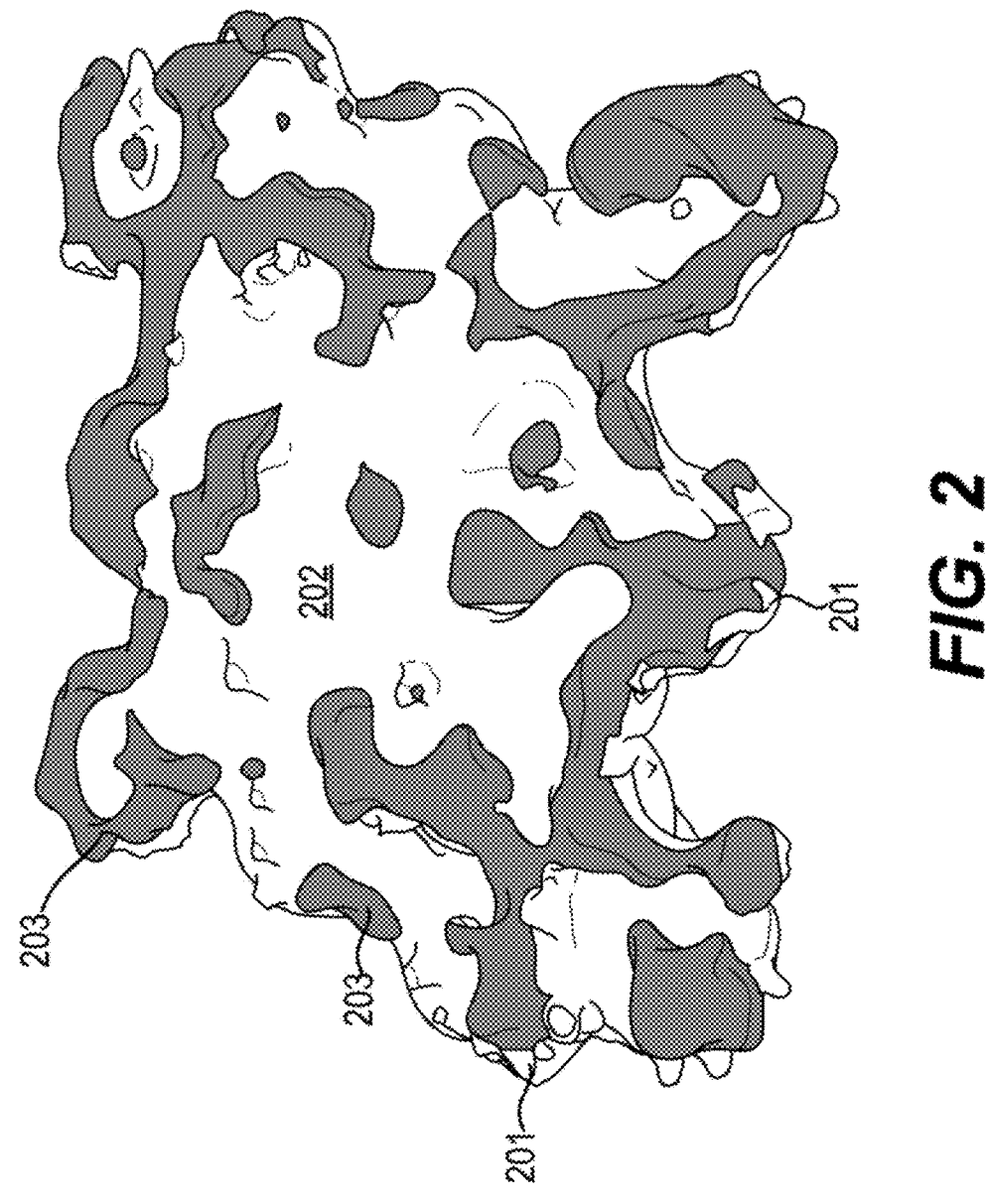
FIG. 2 shows an exemplary source mesh that is associated with a volumetric effect.

FIG. 2 shows a snow buildup effect on a low poly model. As shown in FIG. 2, the low poly model can include mountain meshes (e.g., (201)) and landscape meshes (e.g., (202). Snow buildup (203) can be positioned over the mountain meshes. In an aspect, the low poly model can be an exemplary simplified mesh (104), and the snow buildup (203) can be an exemplary snow build up (105) in FIG. 1.

Still referring to FIG. 1, once the effects (or volumetric effects) are applied, the effects and the simplified world mesh can be converted into volumetric regions, and the volumetric regions can further be fed into an overall bounding box (109). In an example, a size of the bounding box (109) can be defined by the gameplay space. For purposes of concise gameplay, no region may be ever fully empty. Thus, the buildups (e.g., the snow buildup (105) and the fog (106)) and voids (e.g., (107)) in the gameplay space can be remapped in empty spaces of the gameplay space.

As shown in FIG. 1, the bounding box (109) can be a pizza-box shaped volume encapsulating the entire gameplay space. In an example of FIG. 1, the bounding box (109) can contain the mountain (or mountain mesh) (102), a surrounding land (or landscape) (103), and some air (or fog) (106) above a top peak of the mountain.

Figure 3:
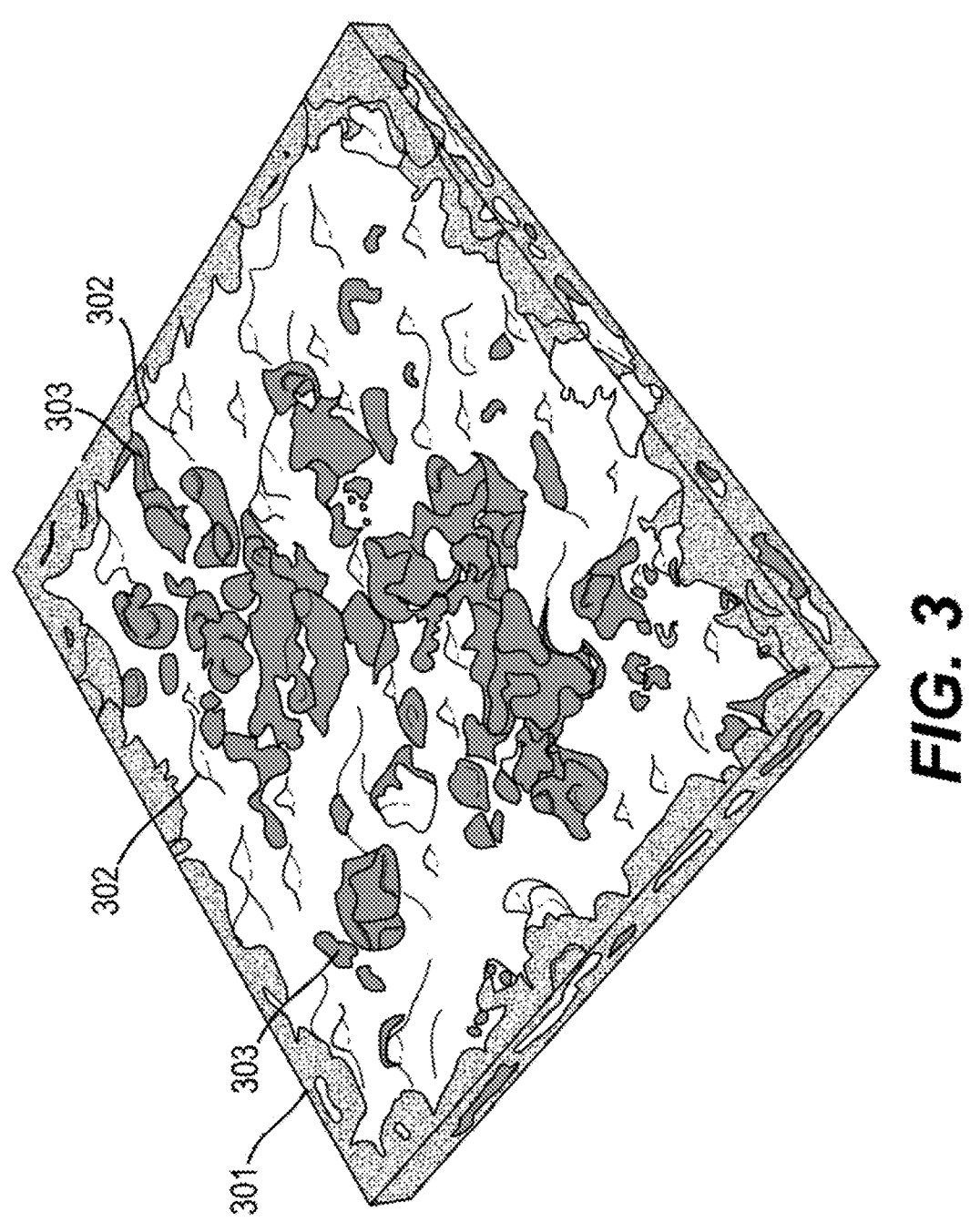
FIG. 3 is an exemplary illustration of forming a volumetric effect in a variable density volume in accordance with some embodiments.

FIG. 3 shows an exemplary bounding box (301). As shown in FIG. 3, the bounding box (301) can include mountains (e.g., (302)) and fog layers (e.g., (303)). In an example, the size of the bounding box (301) can be equal to or less than a gameplay space.

As shown in FIG. 1, the bounding box (109) can represent a variable density volume. Once the bounding box (109) is calculated (or determined), the bounding box (109) can then be converted into a texture by slicing the bounding box (109) into several layers (or a plurality of texture layers). The layers (or texture layers) (108) can further be stacked. In an example, the sliced texture layers (108) can be called as a 'texture strip' or 'volume texture'.

Figure 4:
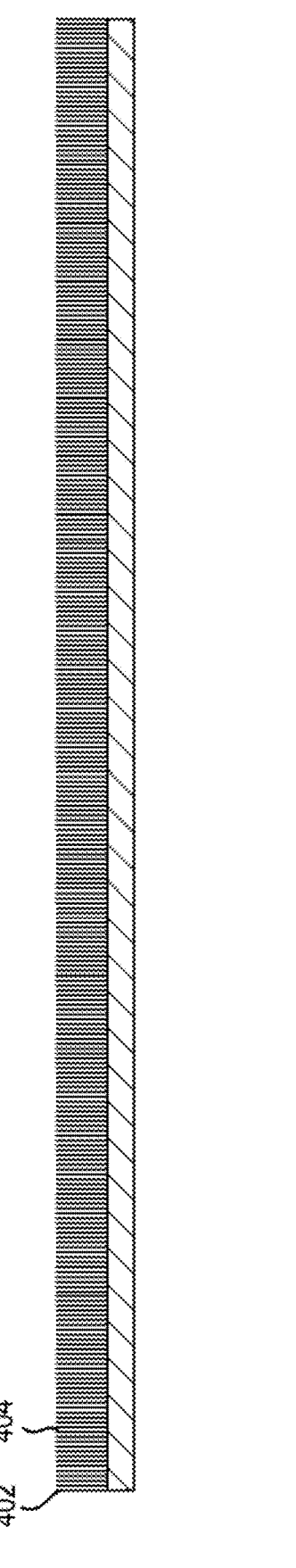
FIG. 4 is an exemplary illustration of a plurality of texture layers sliced from a variable density volume in accordance with some embodiments.

FIG. 4 shows exemplary volume texture (400) that can be sliced from a bounding box, such as the bounding box (301). As shown in FIG. 4, the volume texture (400) can include a plurality of texture layers. Each of the plurality of texture layers, such as the texture layers (402) and (404), can be parallel to a cross-sectional plane of the bounding box, such as the bounding box (301).

In an aspect, a signed distance field (SDF) can be defined in each of the texture layers. The SDF can represent a solid 3D geometry that overlaps with the volume of the bounding box. In an example of FIG. 1, the texture layers can include pixel information of the mountain, the land, and the fog. The SDF can therefore create a texture strip with black pixels under all the land and inside the mountain.

Outputs of the preprocessing shown in FIG. 1 can be the SDF representing a space and a texture of variable density that represents macro weather patterns caused by the landscape. The space defined by the SDF can further be skipped for fluid simulation. In an example, the simulation shown in FIG. 5 can skip the black pixels defined in the SDF during the fluid simulation. The black pixels can represent the solid geometry which is invisible.

In an aspect, the preprocessing can be performed outside a game engine. Thus, volumes, such as the volume defined in the bounding box (109), in the preprocessing can be 'baked' (or processed) outside of the game engine and may not change at runtime of the game play.

Once the texture layers are formed, the texture layers can further be exported for simulation. In an aspect, the simulation can be illustrated in FIG. 5.

The simulation can run a fluid simulation on the volumetric effect, such as the fog (106) in FIG. 1, to provide an animatic/moving volumetric effect (e.g., moving fog). For example, the simulation can simulate a fluid effect (or an interaction) of the fog with moving game units (or game characters). In an aspect, in order to simulate the fluid effect, the units (e.g., moving units or static units) in the gameplay space can be cut out, and the fluid effect may be simulated based on the moving units. The simulation of the fluid effect of the fog can be rendered in real time. For example, outputs of the simulation can be provided in multiple times per second to a render.

Figure 5:
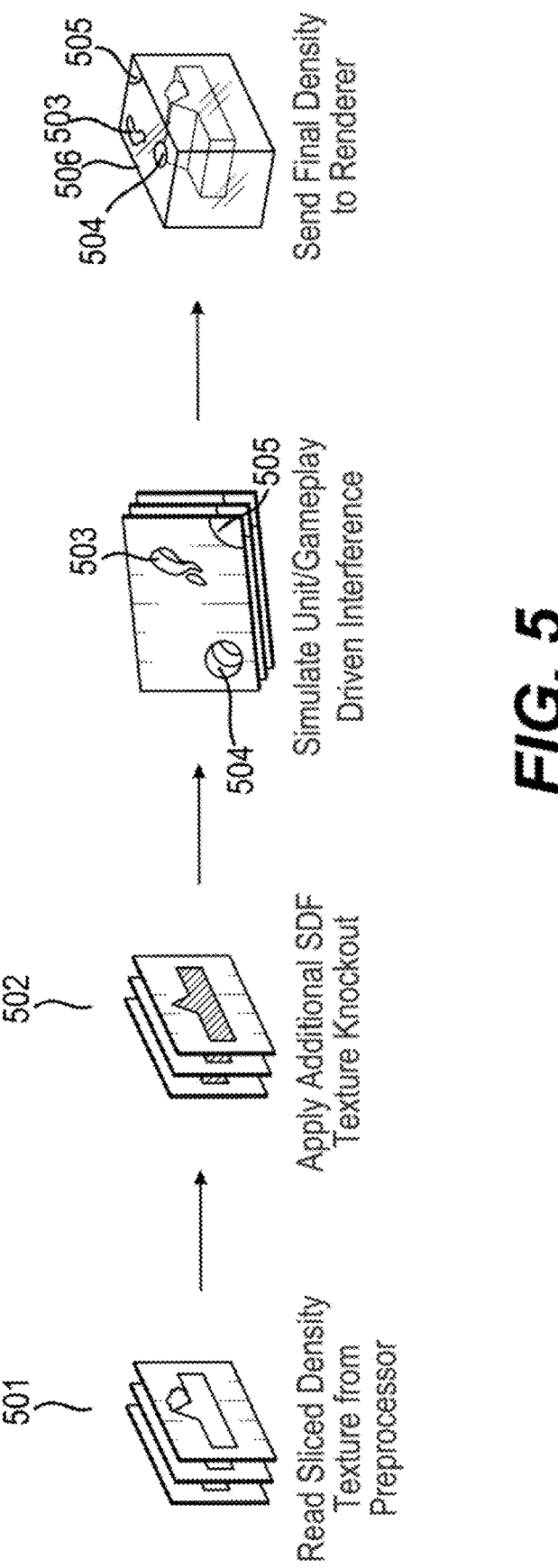
FIG. 5 shows exemplary diagrams of a simulation step to generate a volumetric effect in real time in accordance with some embodiments.

Still referring to FIG. 5, when the preprocessing is complete, a fluid simulation can be performed to determine a gameplay state of the fog volume. The fluid simulation can be run in real time. The simulation can read sliced density texture (or sliced texture layers) (501) from preprocessor. A bounding volume can be defined to calculate. In an example, the bounding volume can include the entire gameplay space, even areas that are not visible to a player in a given frame. In an example, the bounding volume can be a subset of the volume we defined in the bounding box (109). In an example, the bounding volume can be a same volume defined in the bounding box (109). The bounding volume can include an additional non-simulated but rendered space that accounts for areas outside bounds (or boundaries) of the gameplay space, which may still be seen by a camera.

In an aspect, SDF (502) can be applied to the texture layers (108) that are received from the preprocessing. In an example, the SDF (502) as the SDF that is defined in the preprocessing. In an example, the SDF (502) can be defined in the simulation. The SDF (502) can indicate regions that can be skipped for fluid simulation.

Calculations associated with the fluid simulation can be operated at a voxel level. For example, in an exemplary region of 100 pixels long by 100 pixels high by 10 pixels deep, calculation can be performed on 100,000 voxels. In an aspect, voxels that do not need calculation can be defined by determining whether the voxels are inside a geometry (or boundary) of the SDF (502). The SDF (502) can be defined in the preprocessing and rendered to the simulator. Any voxels represented by pixels marked as black in the SDF (502) may not be visible and therefore may be ignored. For rest pixels in the texture layers (108), a fluid simulation can be performed to create holes in which units (or game characters, such as a plane or a tank) are positioned.

Still referring to FIG. 5, the fluid simulation can start by collecting all units. The unites can be game units, such as an airplane, a tank, or a like in the game. A unit can be a character in the game that can be animatic or static. The unit can interface with the volumetric effect, such as fog or cloud. For example, when the character goes into the fog, the fog may disappear. The fluid simulate can calculate the interaction between the volumetric effect (e.g., fog) and the units in the volume (or bounding volume). Based on the bounding volume, an overall region that needs to be simulated can be determined. In an example, the to-be-simulated region can be determined by treating all unit positions as cylinders. The fluid simulation can be performed around surfaces of the cylinders. In addition, any regions that are previously impacted by a movement of the unit can be considered.

Accordingly, a reasonable sub-region can be determined that includes the surfaces of the cylinders. The fluid simulation can be performed on the determined sub-region. Since the number of units interacting with the volume (or bounding volume) can be large and spread out in the bounding volume due to the movement of the units, any optimization to reduce the number of voxels for simulation can be important to achieve real-time speeds.

Once the regions for simulation are determined, a vision range of the unit can be created (or determined) by effectively 'cutting out' an area around each unit, such as stamping down a cookie cutter to get a dough by using the cookie cutter. Accordingly, the unit can be removed in the bounding volume and a region around the surface of the unit can be defined. As shown in FIG. 5, three units can be cut out from the bounding volume, and empty regions (503), (504), and (505) are defined accordingly.

The region around the cut then can get various fluid effects that are applied to the region. The fluid effects can include a twist speed, a wind direction, a gradient falloff, a push/pull, a repel strength, or the like. The applied fluid effects can create lingering tails and handles (or fluid effects) when two cuts merge or split as units converge or split into smaller groups. Thus, surfaces/boundaries of the units can be determined at first by cutting out the units from the bounding volume. The fluid simulation can be applied along the surfaces of units. In an aspect, each union can be cut out, but the fluid simulation may only be applied to the moving units. For example, the fluid simulation can apply to a flying airplane to study how the fog is disturbed by the airplane.

In an aspect, the fluid simulation can also be applied to special cases when units hit up against an edge of the volume/gameplay space.

Results of the fluid simulation can be included in another 'pizza box' volume in which the unit positions are cut out. An exemplary bounding box that includes the fluid simulation results can be shown as a bounding box (506) in FIG. 5. As shown in FIG. 5, the bounding box (506) can have similar size as the bounding box (109). However, the bounding box (506) can further include the simulation results. For example, cutouts (or empty regions) for the units and fluid effects of the fog can be provided in the bounding box (506). The fog in the bounding box (109) can be static, and the fog in the bounding box (506) can be animatic and may flow around the unit positions which are cut out.

It should be noted that the cutout of the unit is an animatic process. As the unit is moving, in situ positions of the unit can be cut out in real time. Accordingly, the volume in the bounding box (506) can be updated in real time. The volume shown in the bounding box (506) can be an animated 3D volume. Information of the volume in a previous frame can be a factor to calculate information of the volume in a current frame. The fluid simulation results shown in the bounding box (506) can further be sent to a renderer for rendering in real time. For example, the fluid simulation results can be sent for rendering in multiple times per second.

Figure 6:
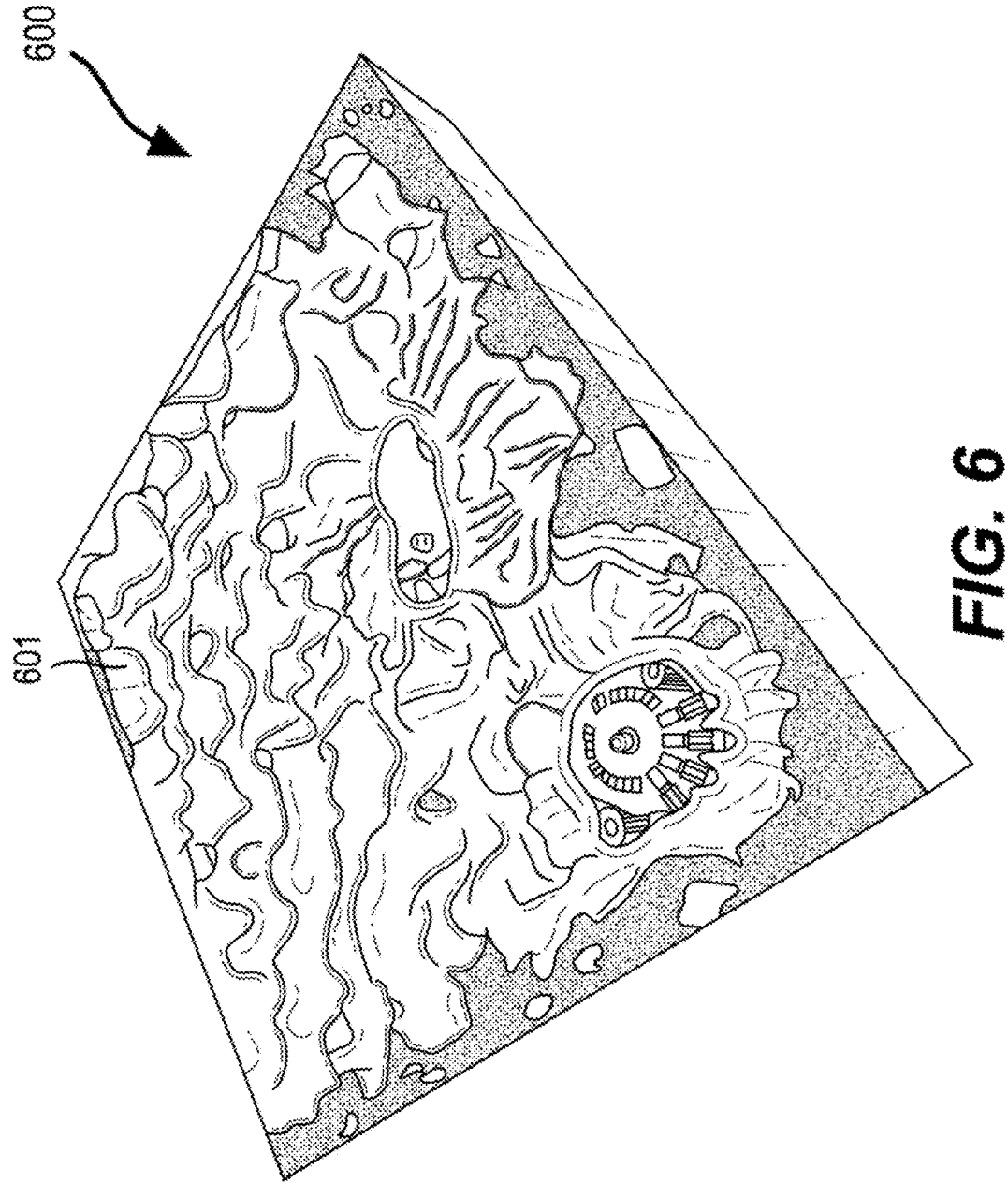
FIG. 6 is an exemplary illustration of a real time volumetric effect in a variable density volume that is interacted with game units.

FIG. 6 shows an exemplary bounding box (600) in which fluid effects (or flow effect) of fog (601) can be shown. As shown in FIG. 6, the fog (601) can accumulate or disappear in a gameplay place defined in the bounding box (600) when the fog (601) interacts with units (not shown) in the gameplay place.

In the rendering, input volumes (e.g., the volume defined in the bounding box (600)) obtained from the fluid simulation can be sent to render the fog effect (of fluid effect of the fog) onto a screen. The rendering can be shown in FIG. 7 in which a series of post processing effects are included.

Figure 7:
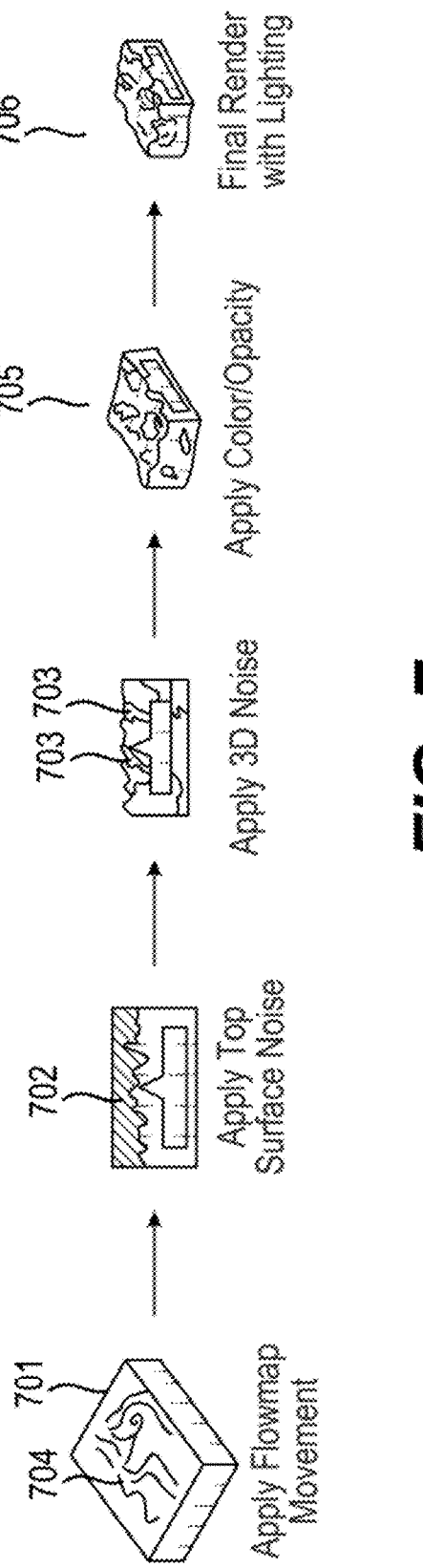
FIG. 7 shows exemplary diagrams of a rendering step to generate a volumetric effect in real time in accordance with some embodiments.

In an aspect of the rendering, a base height (also referred to as base height texture or base height noise) can be determined in the input volumes obtained from the fluid simulation. As shown in FIG. 7, an input volume can be provided in a bounding box (701). In an example, a size of the bounding box (701) can have a similar size to the bounding box (506). The base height can be a greyscale texture (702) that cuts into a top region of the volume. In other words, the top region of the volume can be subtracted or removed to form the texture (702) labelled in greyscale. The greyscale texture (702) can be tiled (or spread) over the bounding box (701) and a depth offset of the greyscale texture (702) can be set to create a higher depth variance. The greyscale texture (702) can also be globally panned over time to create a post process movement. The post process movement can be important to a final look of the fog since a game camera normally looks down at the volume from above.

In an aspect of the rendering, a 3D detail noise (or 3D noise) can be added. The 3D noise can be a low-resolution volumetric noise texture that may further be added to or be subtracted from a final density of any given voxel in the bounding box (701). FIG. 7 shows exemplary 3D noise (703) in the bounding box (701). The 3D noise can look like 3D bubbles in the empty space of the bounding box. The 3D noise can be panned over time at a different speed than the base height texture to create a secondary movement (or relative movement). The 3D noise can be tiled (or spread) as well. The 3D noise can have a higher resolution and be more detailed than noise at the simulation and preprocessing steps.

In an aspect of the rendering, a flow map (704) can be added. The flow map (704) can be hand paint or machine generated. The flow map can be a predefined flow map that introduces additional flow movement different from the flow movement determined in the fluid simulation. The flow map can be a 2D texture that simulates additional fluid movement around obstacles (e.g., the units). Thus, the flow map can be painted (or created) to conform to the 3D environment in the bounding box (701) and can possibly be generated as another preprocessing step. The flow map can be applied optionally to the base height noise (or base height texture) (702) and the 3D noise (703) to create non-uniform movement over time.

The base height texture (702), 3D noise (703), and flow map (704) can be additional modifications to the volume in the bounding box (701). When these modifications are added to the volume in the bounding box (701), the volume in the bounding box (701) can have a final density for any give frame and ready for rendering. In an aspect, raycasting can be applied to determine a final opacity of an effect (e.g., rendering effect) for each pixel on a screen (e.g., the gameplay display screen). In an aspect, the raycasting can include an opacity and color gradient, volumetric falloff parameters, and scene lighting. Exemplary raycasting can be shown in FIG. 7. For example, the opacity and color gradient can be applied in (705), and the volumetric falloff parameters and the scene lighting can be applied in (706).

As shown in (705), by adjusting the opacity and color gradient, the overall opacity of the volume in the bounding box (701) can be modified and the opacity of specific voxels can be expressed as a 1-dimensional gradient mapped to a height of the volume. Because many cutout holes are formed in the fog during the fluid simulation, the opacity and color gradient can allow the look of the fog 'walls' around units to be modified, as well as bring out details in the base height noise.

Figure 8:
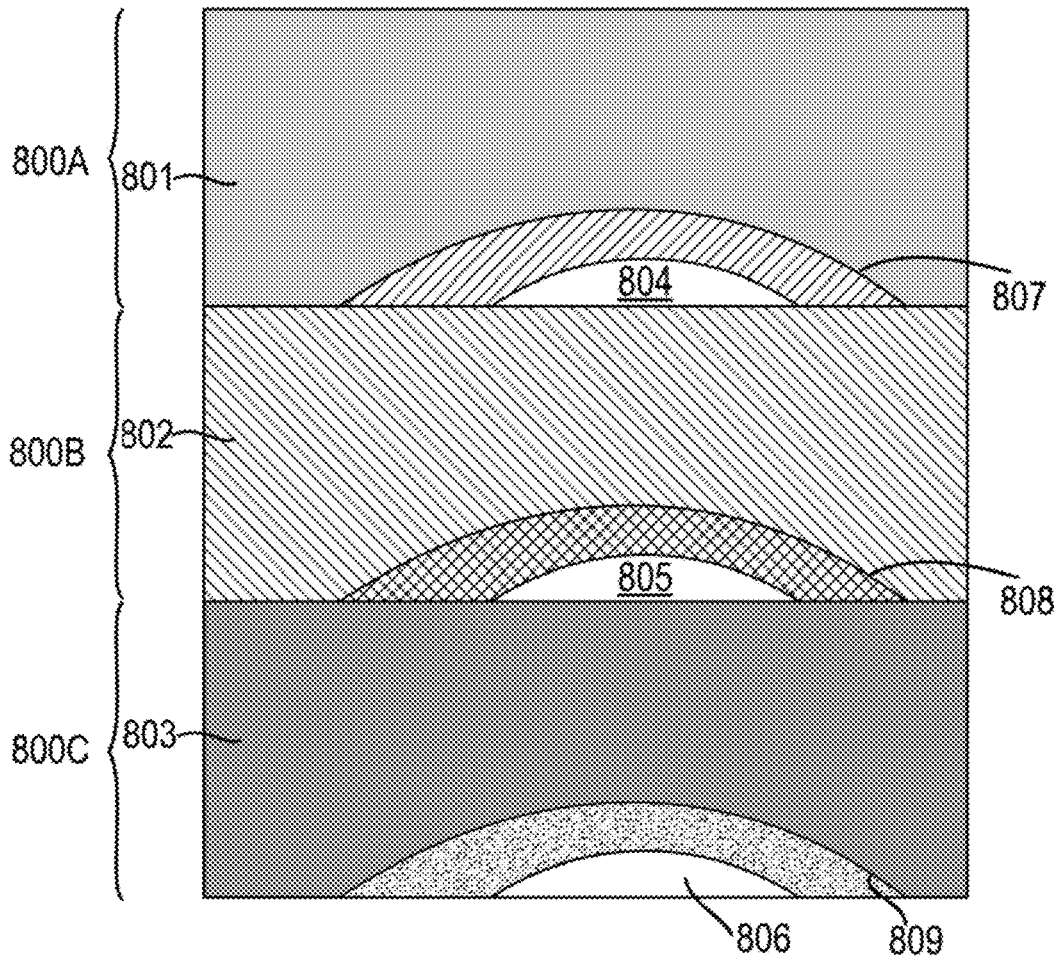
FIG. 8 is an exemplary illustration of various opacity and color gradients for a variable density volume.

An exemplary opacity and color gradient adjustment can be shown in FIG. 8 in which one of an opacity or a color gradient of a volumetric effect (e.g., fog) can be adjusted along a height of a variable density volume (e.g., the volume in the bounding box (701)). As shown in FIG. 8, three top-down views (800A), (800B), and (800C) of a variable density volume (e.g., (701)) are provided. Each of the top-down views (800A), (800B), and (800C) can be obtained through a different height of the bounding box (e.g., (701)) and illustrate a respective opacity and/or a respective color gradient. In the top-down views (800A), (800B), and (800C), the volumetric effect (e.g., fog) can be represented by (801), (802), and (803) respectively, the cutout of a unit can be represented by (804), (805), and (806) respectively, and a surface blending boundary of the cutout can be represented by (807), (808), and (809) respectively.

The volumetric falloff parameters may loosely equate to smoothness and light falloff parameters on a surface shader.

The surface shader can refer to a software module, a hardware module, or a combination thereof, and configured to calculate a final color of each pixel within a material and perform light calculations that define shading of each pixel on a surface of the material. Adjusting the volumetric falloff parameters can impact how light bounces off particles of the fog, creating a sheen or light glare depending on an angle of a light source (e.g., the sun), for example.

Figure 9:
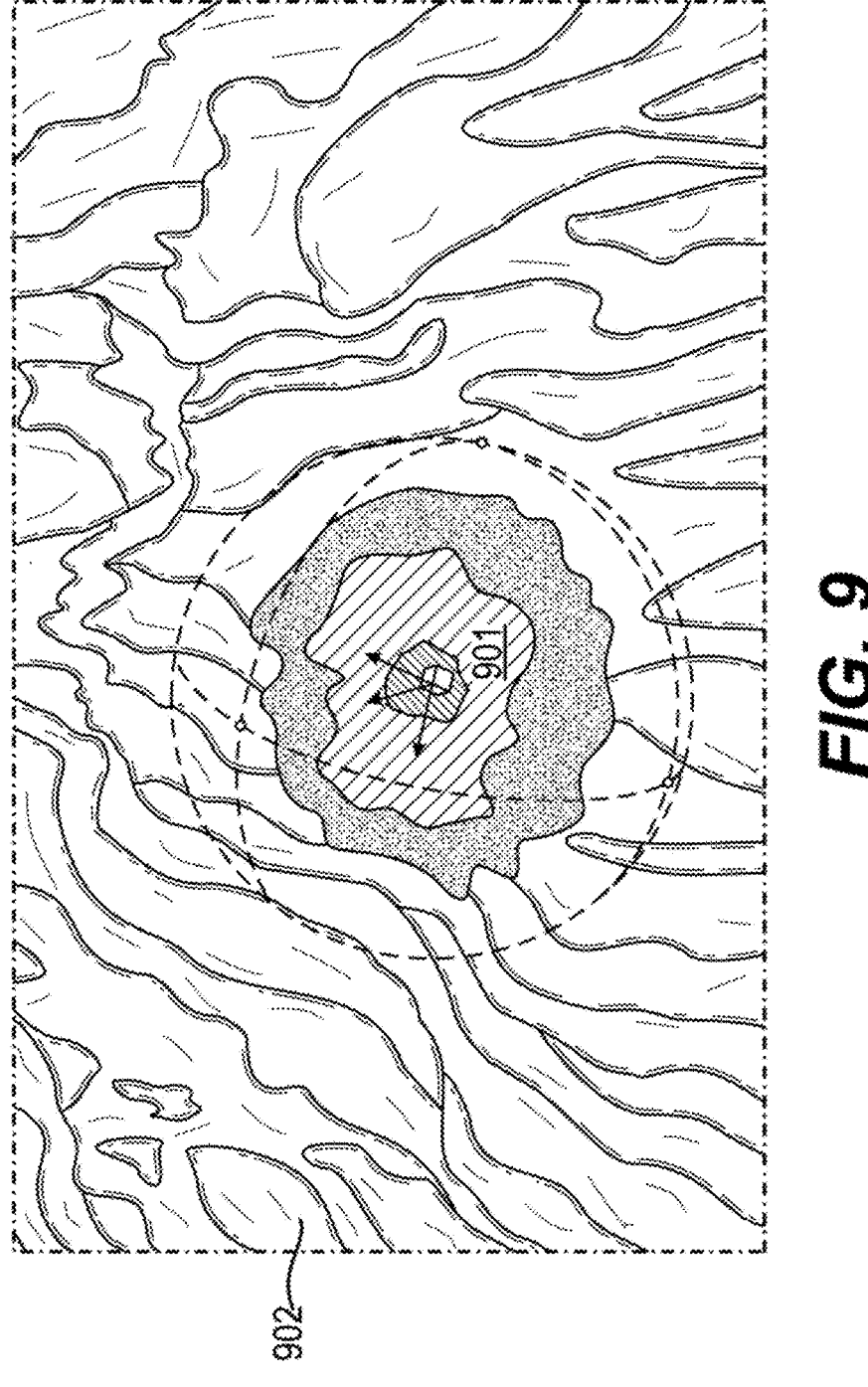
FIG. 9 is an exemplary illustration of scene lighting associated with a volumetric effect.

The scene lighting is configured to define light rendering inside the volume (e.g., the volume defined in the bounding box (701)) to create a volumetric lighting effect. An exemplary scene lighting can be shown in FIG. 9 in which a ray cast of light (901) inside a volumetric effect (e.g., fog) (902) is provided.

In an aspect of the disclosure, additional performance-oriented steps can be in place to reduce a rendering cost of the volume (e.g., the volume defined in the bounding box (506) or the volume defined in the bounding box (701)).

In an example, a resolution multiplier can be applied. According to the resolution multiplier, the fog can be rendered at a fraction of a screen size, such as a half or a quarter resolution, to receive the series of post processing effects (e.g., the base height, 3D noise, and flow map). In an example, when the screen resolution is 4k (3840×2160), the fog can be rendered at a half resolution (e.g., 1080p (1920×1080)) to receive the post processing effects, and then the fog can be upscaled back to the original screen size for a game player.

In an example, checkerboard rendering can be applied. For example, only pixels that change in a checkerboard grid pattern can be rendered while the camera is in motion. Thus, the checkerboard rendering can ray cast even less pixels for any given frame.

Given the lower pixel accuracy caused by the above optimizations (e.g., the resolution multiplier and the checkerboard rendering), a post process of blurring and anti-aliasing can be applied. The post process can reduce aliasing of the volumetric effect (e.g., fog). The post process can average out the rendering results by scaling the resolution of the boundary of the fog back up to the final resolution. The post process of blurring and anti-aliasing can be effective to process the fog or clouds due to the soft nature of fog and clouds.

Figure 10:
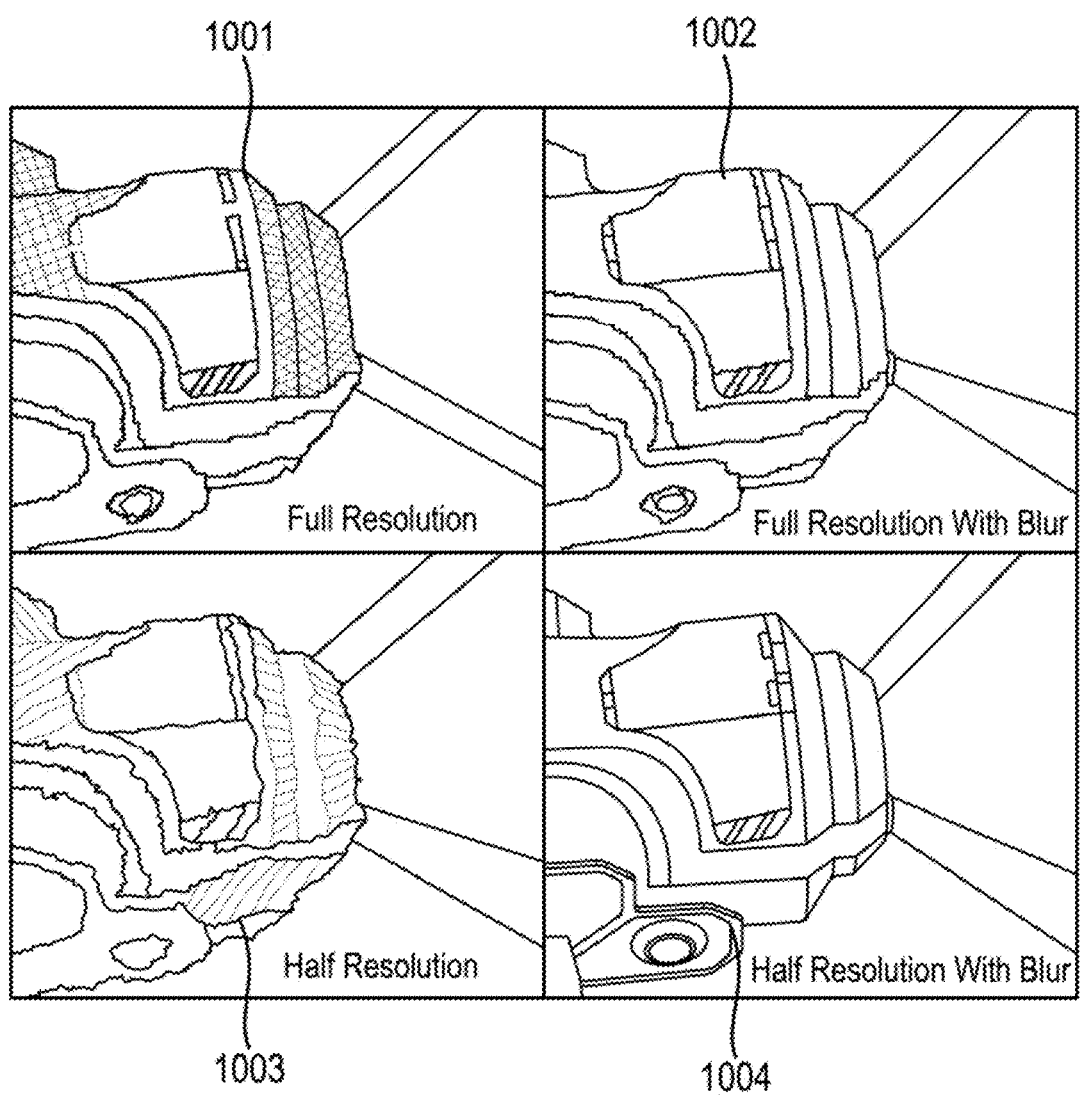
FIG. 10 is an exemplary illustration of a burring and anti-aliasing process in accordance with some embodiments.

An exemplary post process of blurring and anti-aliasing can be shown in FIG. 10. FIG. 10 shows an object (1001) that is rendered in full resolution without blurring treatment and an object (1002) that is rendered in a full resolution with burring treatment. As shown in FIG. 10, the object (1001) shows pixel noise in a meshed pattern compared to the object (1002). FIG. 10 also shows an object (1003) that is rendered in a half resolution without blurring treatment and an object (1004) that is rendered in a half resolution with burring treatment. As shown in FIG. 10, the object (1003) shows pixel noise in a strip pattern compared to the object (1004).

After the post process blurring and anti-aliasing is performed, the effect (or rendering effect) can be added to the rendering stack as part of the final frame delivered to the game player. Thus, in summary, the preprocessing can provide a base volume (e.g., (109)) which can capture the entire gameplay space (including surrounding air) in a pizza box shape (or bounding box). The simulation can apply a fluid simulation to cut out holes based on locations of the game units and geographical features. The rendering can take inputs that are exported from the preprocessing and the simulation with additional parameters (e.g., the base height, 3D noise, and flow map), and render the density volume (e.g., (706)) onto the screen.

The disclosure provides features that add visual polish and enhance the player experience. While tactical information of a vision range of a game unit can be expressed as a simple overlay, the features of the disclosure allow the vision range to be represented in a visually captivating way.

Solutions of the disclosure can be optimized for a specific high volume of interaction use case at a camera angle. While it is possible to leverage out of the box solutions for volumetric effects, related technologies may not be generally optimized for precise gameplay interactions, and many may be optimized for a specific, first-person point of view. The assumption is that a user is inside the volume, where distance-based level of detail can be used to render voxels further from the camera at a lower accuracy or a lower resolution, and little thought is given to what it looks like when looking at a volume from outside of the volume. When a point of view of a game is a top-down view and associated with a tight field of view, both distance-based optimizations and solutions from a camera angle may not be applied. The disclosure can further balance environmental interaction and physical accuracy for extreme performance when compared to related technologies.

In an aspect of the disclosure, a full volume simulation can be applied to determined weather effects in-engine instead of applying an optimized simulation that relies on pre-calculated density volumes.

FIG. 11 shows a flow chart outlining an exemplary process (1100) to form a volumetric effect on a game map of a video game. The process can be implemented by an information processing apparatus or instructions stored on a computer-readable storage medium.

As shown in FIG. 11, the process (1100) can start from (S1101) and proceed to (S1110).

At (S1110), a variable density volume of the game map is determined based on a mesh of the game map and a bounding box. The variable density volume includes the volumetric effect.

At (S1120), the variable density volume is sliced into a plurality of texture layers. Each of the plurality of texture layers includes information associated with at least one of the volumetric effect or the mesh.

At (S1130), an interaction between a virtual object on the game map and the volumetric effect is determined based on movement of the virtual object.

At (S1140), the volumetric effect is rendered based on a cut out of the virtual object in the variable density volume and the determined interaction.

In an aspect, a source mesh is generated in the game map, where the source mesh includes at least one environment element in the game map. Edges and vertices of the source mesh are reduced to generate the mesh.

In an example, the volumetric effect includes one of a cloud layer, a fog layer, a dust storm, and a rainfall.

In an aspect, the variable density volume is sliced into the plurality of texture layers, where each of the plurality of texture layers is parallel to a cross-sectional plane of the bounding box.

In an example, the interaction includes at least one of a twist speed, a wind direction, a gradient falloff, a push/pull parameter, or a repel strength.

In an aspect, a signed distance field (SDF) that includes an invisible geometric region in each of the plurality of texture layers is determined. The virtual object is cut out from the plurality of texture layers to determine a boundary region of the virtual object. The interaction between the boundary region of the virtual object and the volumetric effect is further determined.

In an aspect, a top region of the variable density volume is removed to determine a base height texture.

In an aspect, a 3D noise texture is added to the base height texture in the variable density volume, where the added 3D noise texture has a relative movement with respect to the base height texture.

In an aspect, additional movement information is added to the volumetric effect in the bounding box based on a flow map.

In an aspect, at least one of an opacity or a color gradient of the volumetric effect varies along a height of the variable density volume.

In an aspect, a sheen associated with the volumetric effect is generated by adjusting volumetric falloff parameters of a surface shader, where the volumetric falloff parameters indicate how light bounces off the volumetric effect.

In an aspect, scene lighting is generated based on a ray cast of light inside the volumetric effect.

In an aspect, the volumetric effect is rendered at a reduced resolution with respect to a resolution of a game display of the video game. In an aspect, pixels of the volumetric effect positioned in a checkerboard grid pattern are rendered.

In an aspect, a post blurring process is applied to the volumetric effect to reduce aliasing of the volumetric effect.

Then, the process proceeds to (S1199) and terminates.

The process (1100) can be suitably adapted. Step(s) in the process (1100) can be modified and/or omitted. Additional step(s) can be added. Any suitable order of implementation can be used.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
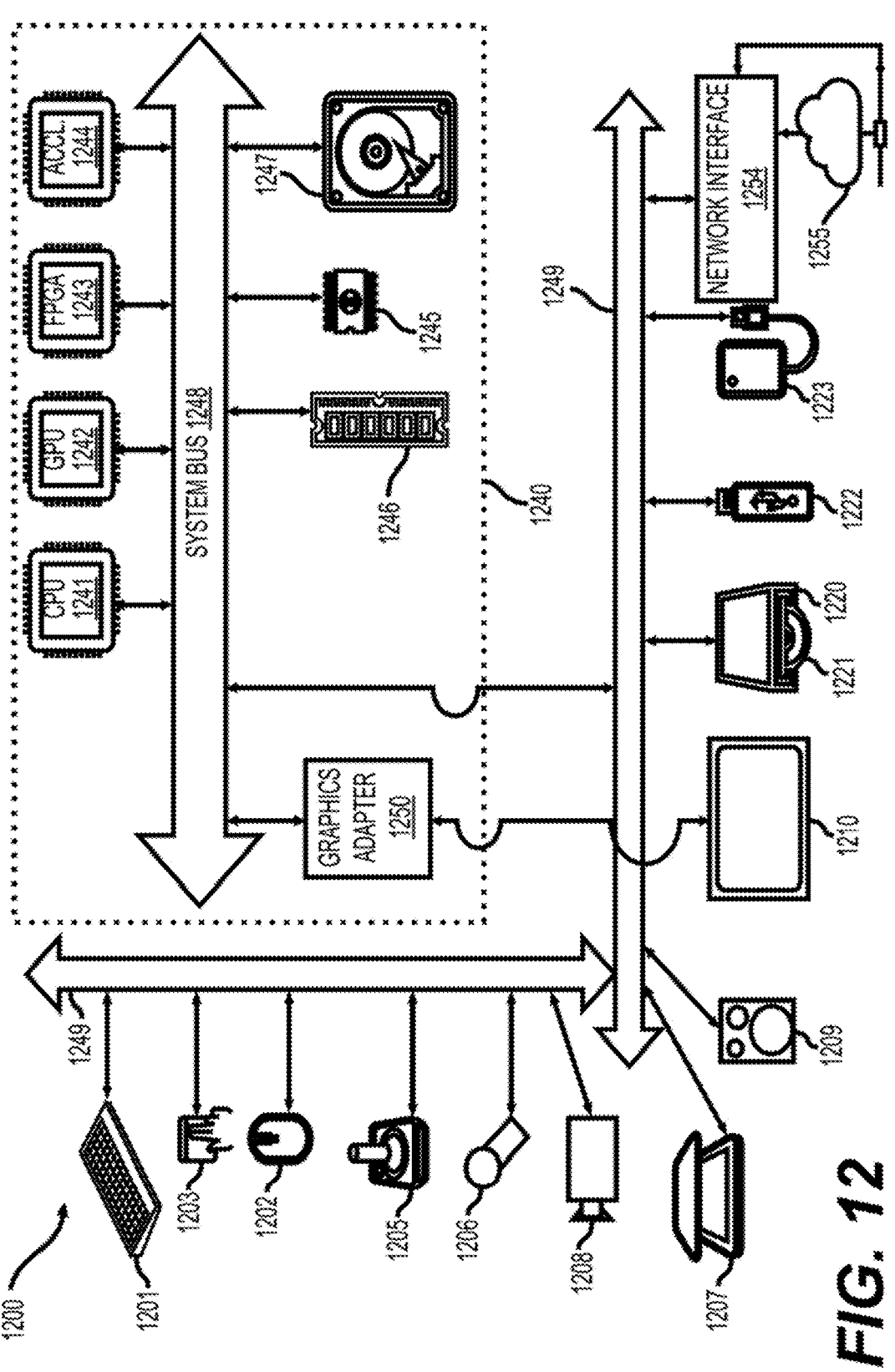
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of forming a volumetric effect on a game map of a video game, the method comprising:
  determining a variable density volume corresponding to a three-dimensional (3D) mesh of the game map and a 3D bounding box that encloses the 3D mesh, the variable density volume including the volumetric effect;
  slicing the variable density volume into a plurality of texture layers, each of the plurality of texture layers (i) including information associated with at least one of the volumetric effect or the 3D mesh and (ii) being parallel to a cross-sectional plane of the 3D bounding box;
  determining an interaction between a virtual object on the game map and the volumetric effect based on (i) a signed distance field (SDF) of a geometric region of the 3D mesh in each of the plurality of texture layers and (ii) a boundary region of the virtual object; and
  rendering the volumetric effect based on a cut out of the virtual object in the variable density volume and the determined interaction.

2. The method of claim 1, wherein the determining the variable density volume further comprises:
  generating a source mesh in the game map, the source mesh including at least one environment element in the game map; and
  reducing edges and vertices of the source mesh to generate the 3D mesh.

3. The method of claim 1, wherein the volumetric effect includes one of a cloud layer, a fog layer, a dust storm, and a rainfall.

4. The method of claim 1, wherein the interaction includes at least one of a twist speed, a wind direction, a gradient falloff, a push/pull parameter, or a repel strength.

5. The method of claim 1, wherein the determining the interaction further comprises:
  determining the SDF of the geometric region of the 3D mesh that is to be skipped for processing in each of the plurality of texture layers;
  cutting out the virtual object from the plurality of texture layers to determine the boundary region of the virtual object; and
  determining the interaction between the boundary region of the virtual object and the volumetric effect.

6. The method of claim 1, wherein the rendering further comprises:

removing a top region of the variable density volume to determine a base height texture.

7. The method of claim 6, wherein the rendering further comprises:

adding a 3D noise texture to the base height texture in the variable density volume, the added 3D noise texture having a relative movement with respect to the base height texture.

8. The method of claim 6, wherein the rendering further comprises:

adding additional movement information to the volumetric effect in the 3D bounding box based on a flow map.

9. The method of claim 6, wherein at least one of an opacity or a color gradient of the volumetric effect varies along a height of the variable density volume.

10. The method of claim 1, wherein the rendering further comprises:

generating a sheen associated with the volumetric effect by adjusting volumetric falloff parameters of a surface shader, the volumetric falloff parameters indicating how light bounces off the volumetric effect.

11. The method of claim 1, wherein the rendering further comprises:

generating scene lighting based on a ray cast of light inside the volumetric effect.

12. The method of claim 1, wherein the rendering further comprises one of:

rendering the volumetric effect at a reduced resolution with respect to a resolution of a game display of the video game; and rendering pixels of the volumetric effect positioned in a checkerboard grid pattern.

13. The method of claim 12, wherein the rendering further comprises:

performing a post blurring process to the volumetric effect to reduce aliasing of the volumetric effect.

14. An apparatus, the apparatus comprising:

processing circuitry configured to:

determine a variable density volume corresponding to a three-dimensional (3D) mesh of a game map and a 3D bounding box that encloses the 3D mesh, the variable density volume including a volumetric effect;

slice the variable density volume into a plurality of texture layers, each of the plurality of texture layers (i) including information associated with at least one of the volumetric effect or the 3D mesh and (ii) being parallel to a cross-sectional plane of the 3D bounding box;

determine an interaction between a virtual object on the game map and the volumetric effect based on (i) a signed distance field (SDF) of a geometric region of the 3D mesh in each of the plurality of texture layers and (ii) a boundary region of the virtual object; and render the volumetric effect based on a cut out of the virtual object in the variable density volume and the determined interaction.

15. The apparatus of claim 14, wherein the processing circuitry is configured to:

generate a source mesh in the game map, the source mesh including at least one environment element in the game map; and reduce edges and vertices of the source mesh to generate the 3D mesh.

16. The apparatus of claim 14, wherein the volumetric effect includes one of a cloud layer, a fog layer, a dust storm, and a rainfall.

17. The apparatus of claim 14, wherein the interaction includes at least one of a twist speed, a wind direction, a gradient falloff, a push/pull parameter, or a repel strength.

18. The apparatus of claim 14, wherein the processing circuitry is configured to:

determine the SDF of the geometric region of the 3D mesh that is to be skipped for processing in each of the plurality of texture layers;

cut out the virtual object from the plurality of texture layers to determine the boundary region of the virtual object; and determine the interaction between the boundary region of the virtual object and the volumetric effect.

19. A non-transitory computer readable storage medium storing instructions which when executed by at least one processor cause the at least one processor to perform:

determining a variable density volume corresponding to a three-dimensional (3D) mesh of a game map and a 3D bounding box that encloses the 3D mesh, the variable density volume including a volumetric effect;

slicing the variable density volume into a plurality of texture layers, each of the plurality of texture layers including (i) information associated with at least one of the volumetric effect or the 3D mesh and (ii) being parallel to a cross-sectional plane of the 3D bounding box;

determining an interaction between a virtual object on the game map and the volumetric effect based on (i) a signed distance field (SDF) of a geometric region of the 3D mesh in each of the plurality of texture layers and (ii) a boundary region of the virtual object; and rendering the volumetric effect based on a cut out of the virtual object in the variable density volume and the determined interaction.

* * * * *